(12) United States Patent
Whiffin

(10) Patent No.: US 11,286,014 B2
(45) Date of Patent: Mar. 29, 2022

(54) MOUNTING BRACKET FOR A BICYCLE LIGHT

(71) Applicant: BLADE BIKELIGHTS LIMITED, Enfield (GB)

(72) Inventor: Sean Whiffin, Enfield (GB)

(73) Assignee: BLADE BIKELIGHTS LIMITED, Enfield (GB)

(*) Notice: Subject to any disclaimer, the term of this patent is extended or adjusted under 35 U.S.C. 154(b) by 46 days.

(21) Appl. No.: 16/984,542

(22) Filed: Aug. 4, 2020

(65) Prior Publication Data
US 2021/0039735 A1    Feb. 11, 2021

(30) Foreign Application Priority Data

Aug. 6, 2019 (GB) .................................. 1911254

(51) Int. Cl.
| | | |
|---|---|---|
| *B62J 6/03* | (2020.01) | |
| *B62J 6/04* | (2020.01) | |
| *B62J 6/16* | (2020.01) | |

(52) U.S. Cl.
CPC . *B62J 6/16* (2013.01); *B62J 6/03* (2020.02); *B62J 6/04* (2013.01)

(58) Field of Classification Search
CPC ....................................... B62J 6/03; B62J 6/04
USPC .................................................. 362/473, 398
See application file for complete search history.

(56) References Cited

U.S. PATENT DOCUMENTS

| | | | |
|---|---|---|---|
| 5,580,151 A * | 12/1996 | Chen .......................... | B62J 6/04 248/215 |
| 5,595,441 A | 1/1997 | McGee | |
| 6,302,567 B1 * | 10/2001 | Gamble, Sr. ......... | B60Q 1/2657 340/431 |
| 6,761,240 B1 * | 7/2004 | Sollitto .................... | B60Q 1/32 180/219 |

(Continued)

FOREIGN PATENT DOCUMENTS

| | | |
|---|---|---|
| DE | 202014010491 U1 | 10/2015 |
| EP | 3521149 A1 | 8/2019 |
| GB | 2544584 A | 5/2017 |

OTHER PUBLICATIONS

Extended European Search Report dated Dec. 21, 2020 from corresponding European Patent Application No. 20189820.2.

(Continued)

*Primary Examiner* — Laura K Tso
(74) *Attorney, Agent, or Firm* — Innovation Capital Law Group, LLP; Vic Lin

(57) ABSTRACT

A mounting bracket for a bicycle light is disclosed which is formed in two parts, a first part for mounting on part of a bicycle frame, the first part having a first magnet, and a second part having an elongate portion arranged to extend laterally away from the plane of the bicycle frame. The elongate portion is arranged for holding a light source at a distal end, and having a having a second magnet arranged towards its proximal end. The second magnet configured to engage with the first magnet to couple the first and second parts together. The first and second parts are further provided with cooperating engagement portions for selectively elastically engaging the first and second parts with one another. Optionally the first and second parts have cooperating alignment portions to help ensure that the coupling occurs at a desired orientation.

12 Claims, 7 Drawing Sheets

(56) References Cited

U.S. PATENT DOCUMENTS

| | | | |
|---|---|---|---|
| 2013/0148375 A1* | 6/2013 | Connor | B60Q 1/30 362/554 |
| 2014/0308062 A1 | 10/2014 | Belozerova et al. | |
| 2015/0146449 A1 | 5/2015 | Freiser | |
| 2016/0102805 A1 | 4/2016 | Khodapanah et al. | |
| 2016/0201886 A1* | 7/2016 | Shen | B62J 6/00 362/473 |
| 2020/0088361 A1* | 3/2020 | Salzinger | F21L 4/02 |

OTHER PUBLICATIONS

Search Report dated Aug. 30, 2019 from GB Application No. 1911254.9.

* cited by examiner

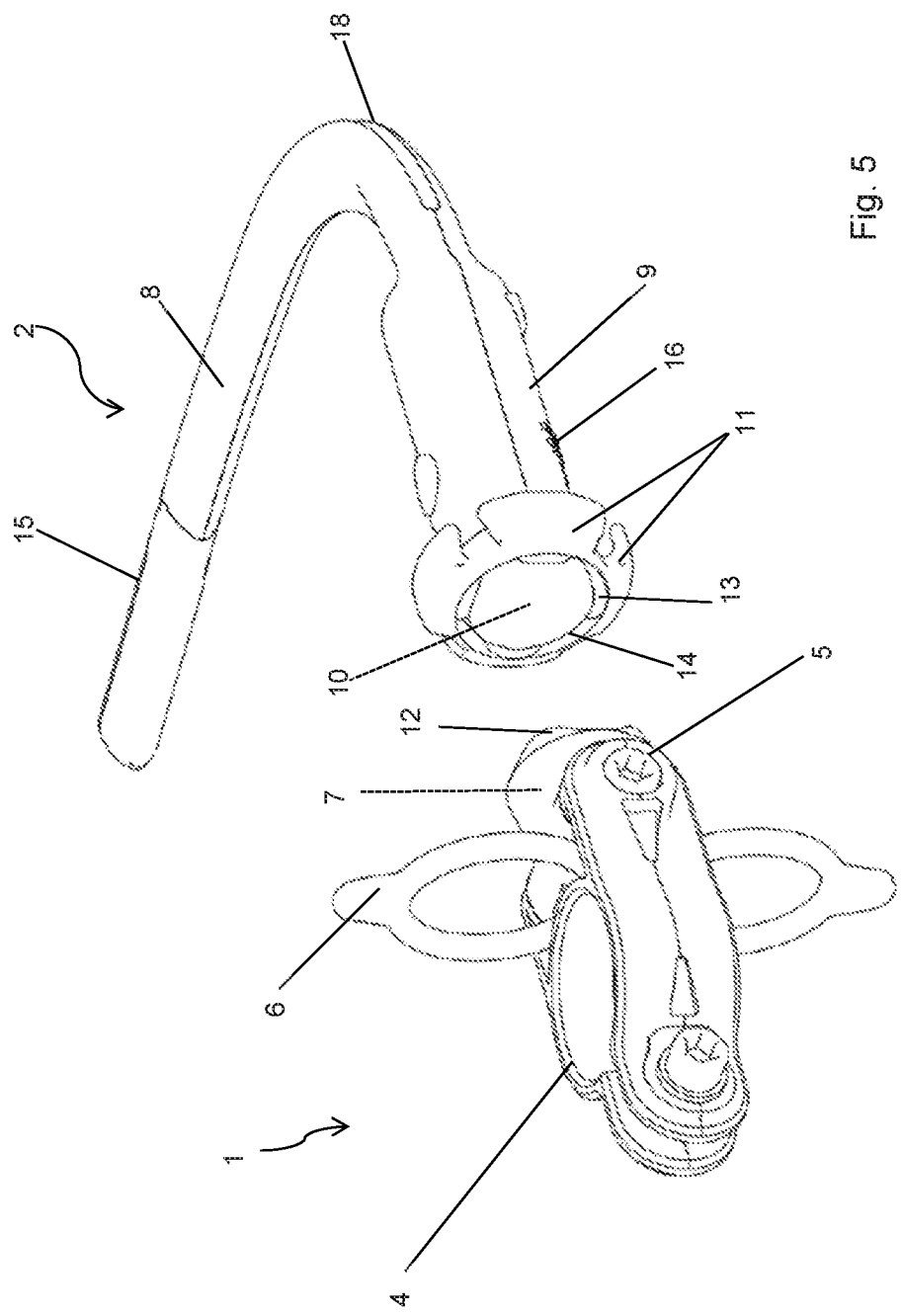

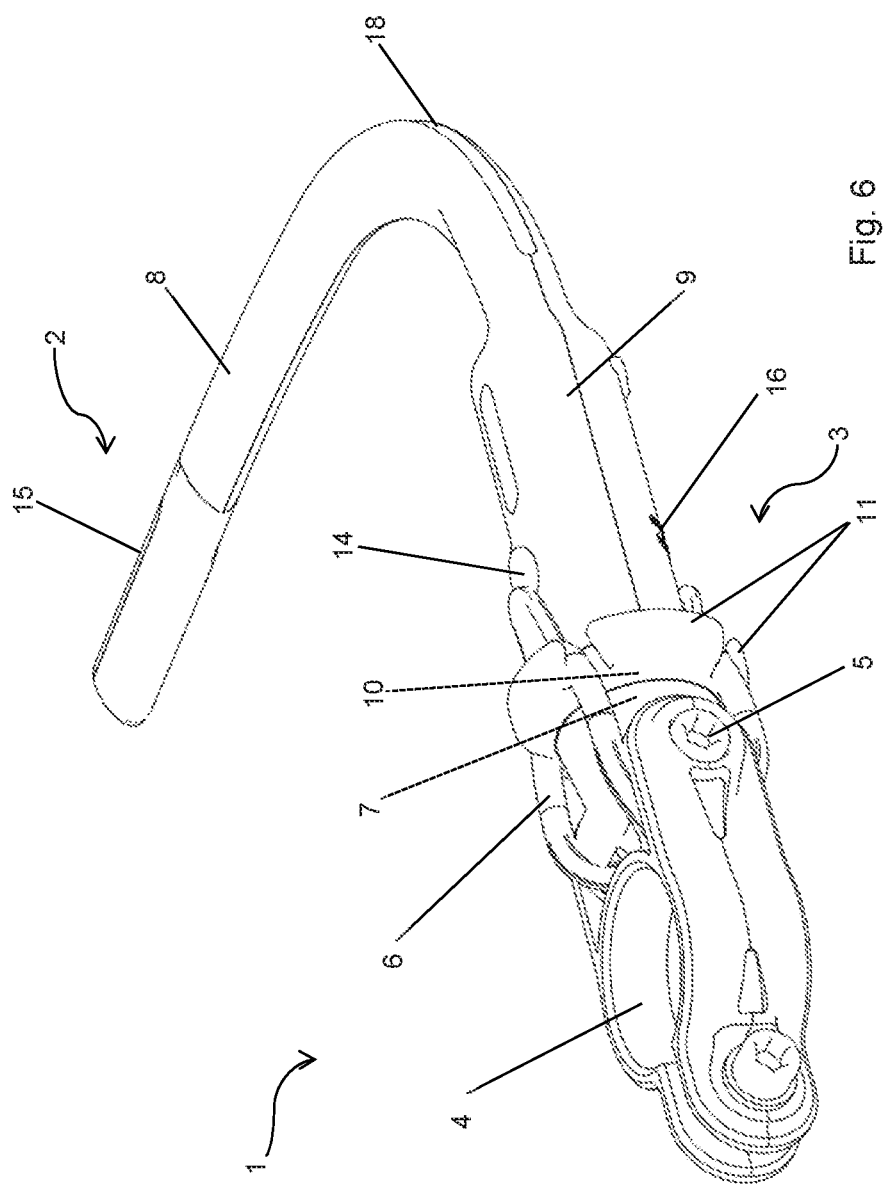

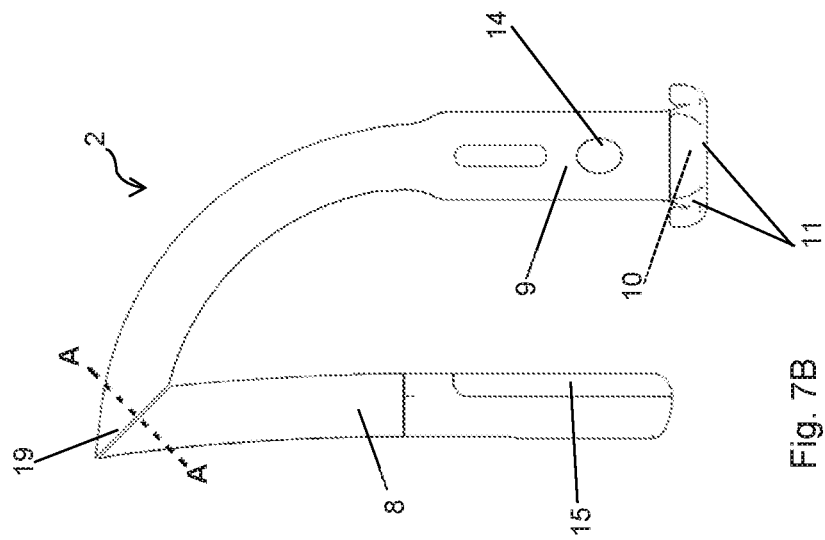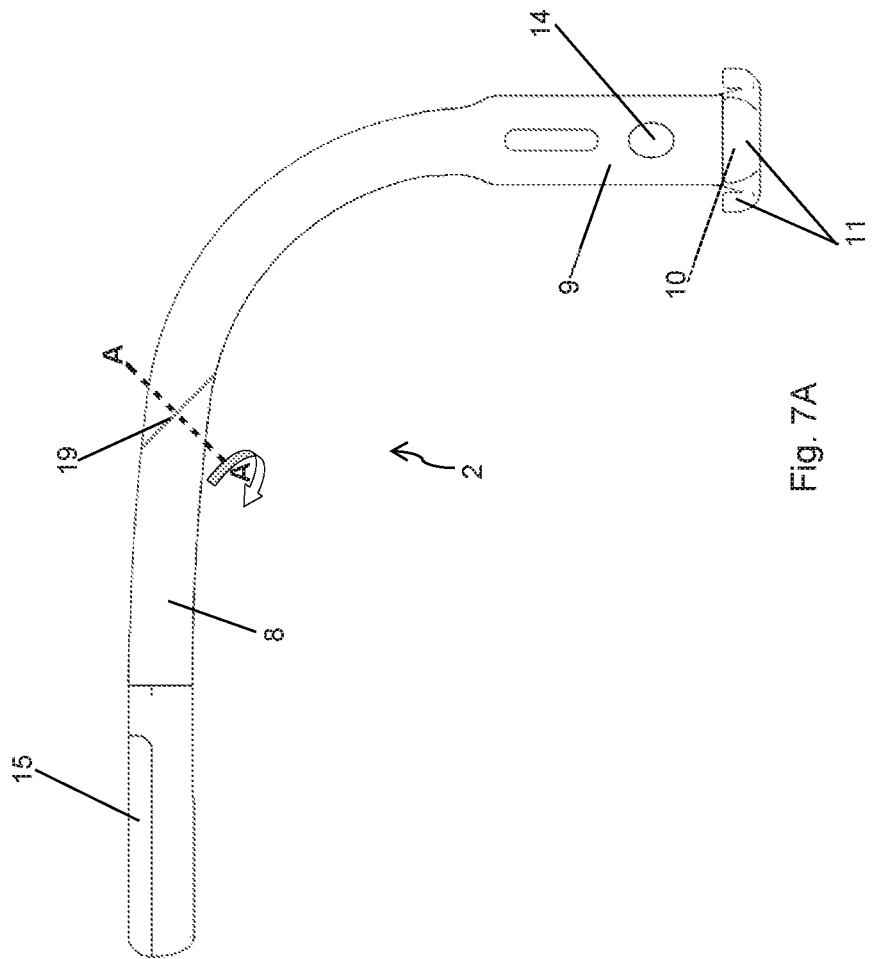

MOUNTING BRACKET FOR A BICYCLE LIGHT

FIELD OF THE INVENTION

The present invention relates to mounting brackets for a bicycle light, and in particular to resilient mounting brackets for a bicycle light which extends laterally away from the frame of a bicycle.

BACKGROUND OF THE INVENTION

To enable cyclists to be seen when riding in dark conditions, it is common to mount lights on the front and the rear of the bicycle. To comply with traffic regulations, the front light is white, and may also serve to illuminate the road ahead for the cyclist, while the rear light is red. The lights may emit continuous or flashing signals, other drivers being more likely to notice a flashing light.

Conventionally, the rear light is positioned centrally on the bicycle, being placed either directly beneath the saddle or on the seatstays or chainstays of the bicycle frame. In the dark, this gives overtaking vehicles no indication of the width of the obstruction presented by the cyclist and can result in traffic driving too close to the cyclist. It is therefore desirable for the rear light to be mounted offset to one side; to the right when cars drive on the left-hand side of the road and to the left in countries where cars drive on the right of the road.

Even front lights may benefit from lateral extent away from the bicycle frame in this way, when the cyclist is using narrows streets or paths and faces oncoming traffic. In such cases, oncoming traffic can benefit from knowing how wide the bicycle is in much the same way as set out above.

Bicycle light assemblies that project laterally are known in the art. U.S. Pat. No. 5,595,441, for example, shows a rear light in the form of two strip lights that project laterally both left and right from beneath the bicycle saddle.

Cyclists often get on to a bicycle by first scootering, that is to say the cyclist will place one foot on a pedal while the other leg is used to push along the ground. After sufficient speed has been reached, the cyclist would swing his second leg over the rear wheel and take up a position on the saddle.

A problem presented by laterally projecting lights is that they tend to get knocked by the cyclist if mounting the bicycle in this manner. In addition, bumpy roads or cycling over a drop such as a curb can jolt the mounting, and cause the light to be knocked off alignment. This in turn can reduce the effectiveness of the light and lead to safety issues. Laterally projecting lights are particularly susceptible to misalignment through jolting due to the large moment which is present in the laterally extending mount. In other words, because the light (which may be relatively heavy) is mounted at the end of a laterally projecting arm, a lever effect occurs which places additional force on the coupling, compared with bicycle lights which do not project laterally, and which therefore do not present this lever effect.

The present invention aims to address some or all of these drawbacks.

SUMMARY OF THE INVENTION

Disclosed herein is a two part mounting bracket for a bicycle light, the mounting bracket comprising: a first part for mounting on part of a bicycle frame, the first part having a first magnet; a second part having an elongate portion arranged to extend laterally away from the plane of the bicycle frame, the elongate portion being arranged for holding a light source at a distal end, and having a having a second magnet arranged towards the proximal end, the second magnet configured to engage with the first magnet to couple the first and second parts together; and wherein the first and second parts are provided with cooperating engagement portions for selectively elastically engaging the first and second parts with one another.

The magnets are provided such that they can interact with opposite poles facing each other so that the two parts are attracted to one another. In other words, the first part may have a north pole facing outward, and the second part may have a south pole facing outward, thereby causing the two parts to feel an attractive force between them, when brought close together. Alternatively, of course, the first part may have a south pole facing outward and the second part may have a north pole facing outward, also causing the desired attractive force.

While the use of magnetic couplings is known, they are not generally suitable for laterally extending bicycle lights because the large lever force described above easily decouples the magnets (even for the strongest magnets), causing the second part to drop from the coupling and detach entirely from the bicycle. They also have limited resistance to torques (as rotations do not affect the coupling energy, which is based on a separation, not an orientation of the two magnets), which can cause the lateral arm to droop if not otherwise supported. To solve these problems, cooperating engagement portions are provided to allow a selective elastic engagement to be formed which stabilises the magnetic coupling both against twisting and also against jolting forces decoupling the magnets entirely.

This arrangement provides a balance between the magnetic coupling which exerts a force which is stronger when the two parts are closest and the elastic engagement which exerts a force which is stronger when the two parts are further apart from one another. Thus, the elastic engagement provides a restoring force to correct large deviations from the coupled positon (stronger forces when the deviation is largest), and bring the magnets back within a distance of one another which allows them to exert an effective force on one another. Once they are within this distance of one another, the magnets can ensure that the two parts reach an optimum configuration. In other words, the magnets can ensure that the two parts are brought into a closest possible arrangement, as magnetic interactions tend to bring the two magnets as close together as possible.

The first part is usually arranged to attach around a generally vertical part of the bicycle frame, meaning that the orientation of the coupling in a yaw direction (into and out of the plane of the bicycle about a vertical or substantially vertical axis) can easily be adjusted by adjusting the coupling to the bicycle frame.

The term "the plane of the bicycle" is used herein to refer to the vertical plane of symmetry of the bicycle, that is to say the plane containing the rims of the front and rear wheels (when the bicycle is upright and travelling or arranged to travel in a straight line) and normal to the axis of rotation of the rear wheel. In such cases, the lateral extension of the second part away from the plane of the bicycle is to be understood as projecting substantially sideways from the frame, which is to say in a horizontal direction transverse to the plane of the bicycle.

The terms proximal and distal are used herein to mean respectively the parts of the mounting bracket which are closest to and furthest from the bicycle frame, when the coupling is correctly mounted on the bicycle frame. In other words, the distal end of the second part is arranged to hold the light because this part is furthest from the frame, and the purpose of the laterally extending portion is to space the light away from the bicycle frame to indicate the width of the bicycle. Similarly, placing the second magnet at the proximal end of the second part provides a place to couple the second part to the first part which ensures that the light is spaced away from the bicycle frame by substantially the full length of the elongate portion.

The two part nature of the coupling allows the first part to be retained on the bicycle while a user can decouple the second part and take it away with them. For example, it is common for bicycle lights to be damaged or stolen if left on a bicycle. By allowing a user to easily remove the delicate and more costly operational parts (e.g. those for holding the light laterally spaced from the plane of the frame of the bicycle, and optionally the light itself) they can be protected from such fates. Similarly, the process of attaching a mounting bracket (i.e. the first part) to a bicycle frame can be tedious to complete each time a user wishes to use their bicycle. Thus allowing the second part to remain on the bicycle simplifies the use of the mounting for a user. The coupling between the two parts provides the desired resilience to accidental decoupling, but easy mounting and demounting by the user. In addition, the first part can be provided with a substantially permanent connection to the bicycle frame (i.e. a clamp which requires tool to remove), which can therefore be more firm and rigid (and protected against theft) than would be possible with an attachment which is intended to be removed often.

Also disclosed herein are the two parts separately. In other words, the disclosure extends on one hand to a first part of a two part mounting bracket for a bicycle light, the first part configured for mounting on part of a bicycle frame, the first part having a first magnet configured to engage with a second magnet of a second part of the two part coupling, the first part further comprising engagement portions for selectively elastically engaging cooperating engagement portions on the second part.

On the other hand, the disclosure also encompasses a second part of a two part mounting bracket for a bicycle light, having an elongate portion arranged to extend laterally away from the bicycle frame, the elongate portion being arranged for holding a light source at a distal end, and having a having a second magnet arranged towards the proximal end, the second magnet configured to engage with a first magnet on a first part of the two part coupling and further comprising engagement portions for selectively elastically engaging cooperating engagement portions on the first part.

As discussed above this has the advantage that the two parts can be both elastically and magnetically coupled to provide a resilient mounting to the bicycle frame. It is clear that these two parts are cooperating interrelated parts much like a plug and socket.

In addition to the yaw axis described above (a vertical axis in the plane of the bicycle), there are two further rotation axes, both horizontal: pitch and roll. The roll axis lies in the plane of the bicycle, while the pitch axis is at right angles to the roll axis, i.e. parallel to the axis of rotation of the rear wheel.

Optionally, the two part mounting bracket further comprises first alignment portions on the first part and second alignment portions on the second part, arranged to cooperatively align the first and second parts. In addition to the elastic and magnetic couplings described above, which respectively provide course and fine grained alignment of the position of the two parts relative to one another, the alignment portions allow control over the orientation of the second part, specifically, the orientation in a roll direction relative to the plane of the bicycle.

The cooperating alignment portions may comprise at least one protrusion on one of the first and second parts; and a corresponding recess on the other of the first and second parts. The protrusion and the recess may have the same shape and size, so that the protrusion fits neatly into the recess. When fit together in this way, they provide stability against roll motions because removing the protrusion from the recess requires movement apart of the two parts, which are biased towards each other by both the attractive force between the two magnets and the elastic force from the cooperating engagement portions.

In some examples, there may be multiple protrusions and corresponding recesses, for example wherein each protrusion spaced apart from adjacent protrusions around a circle centred on the centroid of one of the outward-facing parts of the first or second magnets (that is, the parts intended to be closest to each other when coupled). In such a case the recesses are spaced apart around circle in a corresponding arrangement, the circle being centred on the centroid of the other of the first and second magnets. When the protrusions and recessed are unevenly spaced or different in shape and/or size from each other, this can be used to define a single stable orientation (about the roll axis) for the second part to be mounted relative to the first part, e.g. to ensure that the light projects laterally to the right for countries where driving is on the left and vice-versa. In cases where n protrusions and corresponding recesses are provided evenly spaced from one another and the same shape and size as one another then the coupling has n-fold rotational symmetry about the roll axis, meaning that each protrusion can fit into any one of the n recesses, and a rotation by 360°/n will align that protrusion with an adjacent recess. Since the protrusions are equally spaced, they are inherently 360°/n apart from one another, so each recess holds a protrusion in all configurations.

A particularly advantageous number of protrusions and recesses is four. This allows a user to easily adjust the orientation of the lateral projection between the left, right, up and down directions, i.e. separated from one another by 360°/4=90°. In particular a user can arrange the light to project in a left or right configuration to adapt the mounting bracket to local driving conventions. Indeed, the up and down configurations allow a front light to be mounted as a vertical strip, which some users may prefer, while the same mounting bracket can be supplied to mount the rear light with a sideways (left or right) lateral projection.

In some cases, either of the first and second parts may have the protrusion(s) and the other part has the recess(es). In some cases, each part may have both protrusions and recesses for cooperating with one another.

The protrusion and the recess each have a curved profile. This can be used to cause the bracket to "snap" into the preferred roll orientation as the two parts are urged together under the action of the elastic engagement and the magnets. The curved profile translates some of the attractive force into a roll motion to correctly orient the protrusion to fit into the recess, as this allows the protrusion to fit into the recess as far as it can.

The cooperating engagement portions may comprise a loop of stretchable material on one of the first and second parts; and a projection for retaining the loop of stretchable material on the other of the first and second parts. In other words, the stretchable material is an elastic material in the sense that it is capable of being stretched when tension is applied and which returns to its unstretched configuration when tension is removed. To provide support to the magnetic coupling, the stretchable material is stretched over the projection which in turn retains the loop. In general, the projection is positioned to hold the stretchable material in a stretched state so that the stretchable material is under tension and exerts a force on the two parts to press them against each other. This positive force also helps to retain the loop firmly around the projection. As the loop is held in place by the projection, accidental knocking of the second part relative to the first part provides an elastic restoring force against linear motions separating the two parts. In addition, since the restoring force is based on the loop being as short as possible, bending forces (i.e. pitch or yaw motions of the second part relative to the first part) and twisting forces (roll motions of the second part relative to the first part) are also counteracted by the elastic loop being retained by the projection.

The projection is shaped to retain the loop. This may mean that the projection has a channel or U-shaped portion which can hold the loop in the lowest portion of the U. In other words, the projection is a lip having a portion which curves away from the stretchable loop to help hold it in place.

The stretchable loop may be provided on the first part and the projection provided on the second part. This can simplify the removable second part, and make it easier for a user to store the second part once removed. Alternatively, the stretchable loop can be provided on the second part and the projection provided on the first part. This can ensure that the stretchable loops are removed with the second part, when a user parks their bicycle. In turn this can help prevent degradation of the stretchable loops as they needn't be left attached to the bicycle on the first part. This can open up more materials from which the stretchable loop can be made, as it needn't be chosen with a view to being compatible with being left outside permanently. In some cases, there may be multiple loops, all on the first part, all on the second part, or some on the first part and some on the second part.

Indeed, in a preferred embodiment there are two stretchable loops and at least two projections, one projection corresponding to each stretchable loop. Advantageously in this example, there may be four projections. This is because a loop hooked over a projection has two stretchable strands bridging the gap between the first and second parts. Thus two loops have four strands bridging the gap, and implying a four-fold symmetry. The second part can thus be rotated 90° (about a roll axis) relative to the first part without the locations of the strands changing. However, when only two projections are provided, there would be nothing to hook the strands over in the 90° rotated arrangement. Consequently, providing four equally spaced projections for two stretchable loops allows mounting along four orientations to be easily achieved in a manner which a user finds easy to switch between.

In cases where cooperating alignment portions are provided, it can be advantageous for the rotational symmetry of the alignment portions to correspond to the rotational symmetry of the cooperating engagement portions. Where the alignment portions and the engagement portions each provide a four-fold rotational symmetry as described above, the user is provided with two ways to adjust the device by 90°. A first way to achieve this is to simply decouple the first and second parts, and recouple them with a 90° offset from the previous position. Another way to achieve this is to simply stretch the stretchable loops and twist the second part 90° relative to the first part, while retaining the loops around the projections. Once a 90° rotation has been made, the alignment portions will once more fit protrusions into recesses. This fit prevents the rotational restoring force from the stretchable loops from returning the device to the original (un-rotated) arrangement. For example, in this arrangement the second part could be mounted with the elongate portion vertical, so that left or right lateral extension is possible while only straining the stretchable members by 90°. This allows a user to switch easily and quickly between vertical and left/right horizontal projection directions. Of course, corresponding comments can be made in respect of different rotational symmetries. Most users find the three positions described above (left, right, up) to be sufficient and most desirable, which leads to the four-fold rotational symmetry being the preferred embodiment.

In some cases, the elastic coupling may be provided by different arrangements. For example, it is not necessary for the elastic material forming part of the cooperating engagement portions to be in the form of loops, but may comprise instead one or more single straps mounted on one of the first and second parts, wherein the strap has a hook or clip on one end. The other of the first and second parts in this example has a corresponding flange, lip or eye to which the hook or clip is arranged to attach.

In any case, stretchable parts of the elastic couplings may be formed from natural or synthetic rubbers, silicon rubbers, elastomers, etc.

In the examples where there is a loop of stretchable material and a projection, the projection may be shaped to cause the loop of stretchable material to flare outward when the loop of stretchable material is stretched over the projection. For example the projection may have a convexly curved profile on the portion of the projection which holds the loop. Additionally or alternatively, the projection may be wider than the width of the loop, causing lateral stretching in addition to longitudinal stretching caused by the loop being stretched over the projection. This can help to stabilise the engagement between the loop and the projection.

The second part may be generally L-shaped, such that the elongate portion arranged to extend laterally away from the bicycle frame forms a first portion and a second portion extends transversely away from the first portion to space the first portion away from the coupling between the first and second parts. This can position the laterally extending elongate portion rearward of the user, thereby reducing the likelihood of a user knocking the elongate laterally extending portion with their leg as they swing their leg over to mount the bicycle from a scooting position, or even during a normal pedaling motion.

Optionally, the second part is foldable from the generally L-shaped configuration to a generally oblong configuration. For example a flexible portion lockable in a folded configuration or an L-shaped configuration. Alternatively, there may be a rotational coupling arranged part way along the laterally extending elongate portion, for folding the distal end of the elongate portion between the L-shaped configuration and a generally oblong shape. Advantageously, the light may be folded to face the second portion of the second part, thereby protecting the light from accidental damage, for example in the event of a user putting the device in their pocket.

In some cases, the disclosure may extend to a generally L-shaped bicycle light having a first portion having a light at its distal end and a second portion for mounting to a bicycle frame, the L-shaped bicycle light having a folding connection on the first portion, wherein the folding portion comprises a beveled joint angled at approximately 45° to the extent of the first portion. The folding connection may be provided with a feedthrough for cables to ensure that the cables can extend between the first and second portions, for example to couple a battery housed in the second portion with the light. The folding connection may be lockable to hold the L-shaped bicycle light in one or more of a folded configuration in which the light lies against the second portion, and an unfolded configuration in which the first portion extends laterally away from the second portion.

The mounting to a bicycle of the L-shaped bicycle light may be provided by the two part coupling bracket as described elsewhere herein.

The two part mounting bracket may further comprise an adjustable connection between the bicycle frame and the distal end of the second part for adjusting the pitch of the second part relative to the bicycle. Since the yaw can be adjusted using the mounting to the bicycle frame, and the roll can be adjusted using the coupling between the two parts, so providing a pitch-adjustable connection as well can provide full control to a user of the orientation of the device. In this case, "between" means anywhere between the portion on the first part which is arranged to mount onto a bicycle frame and the distal-most end of the second part 2. For example, the pitch-adjustable coupling can be on the first part 1, closer to the bicycle frame than the first magnet, or it can be on the second part 2, further from the bicycle frame than the second magnet.

As an example, the pitch-adjustable connection can be formed of a pair of interlocking toothed or castellated portions tightenable by a nut and bolt to selectively engage the castellations to prevent relative rotational movement about the pitch axis. When the nut and bolt is loosened, the castellations can be disengaged to allow pitching motions. The castellations can be square-profiled or they can have a triangular profile to ease the relative motion, and allow easy locking into place when the nut and bolt are tightened.

The two part mounting bracket may further include a light mounted on the distal end of the second part. In some cases, the light may be provided separately, in order to allow a user to select their own light. In other cases, the light may be provided integrally, for simplicity.

The lights may be removable and/or interchangeable. For example, red lights may be provided for use at the rear, white lights may be provided for use at the front. A user can select the correct light for their intended use and mount it to the desired end (front/rear) of their bicycle. The light can be positioned to be directed forwardly if placed at the front or rearwardly if mounted at the rear. In some cases, a single mounting bracket may have a red light facing rearwardly and a white light facing forwardly. Optionally a yellow or orange indicator light may be provided on the distal end, to alert other road users that the bicycle is about to turn. Optionally the mounting bracket may further include a reflective strip facing outwardly to further alert road users to the bicycle in the event that the light is low on battery and therefore not shining as brightly. Each of these lights (red, white, yellow) may be provided as continuous or flashing lights. Indeed, in some cases, a user may be able to switch between continuous and flashing modes.

The second part of the two part mounting may comprise a water-resistant housing, having a cavity for receiving electronic components. For example, one or more of a batter, control circuitry, control switch, wires or other electrical connections, a charging connection for the battery, or the light itself may be located inside the waterproof housing, thereby protecting them from water damage, for example when the user is cycling in the rain.

Embodiments of the invention allow the arm carrying the light emitting element(s) to be deflected, be it accidentally or intentionally, yet ensures that the arm will return to, or stay when returned to, its desired position, projecting laterally from the bicycle.

BRIEF DESCRIPTION OF THE DRAWINGS

The invention will now be described further, by way of example, with reference to the accompanying drawings, in which:

FIG. 5 is a perspective view of the two part mounting bracket shown in FIG. 1, with the two parts separated from one another;

FIG. 6 is a perspective view of the two part mounting bracket shown in FIG. 1, with elastic couplings engaged; and FIGS. 7A and 7B show a plan view of an alternative design of one of the two parts of the mounting bracket of FIG. 1, in which the part is L-shaped and foldable.

DETAILED DESCRIPTION OF THE DRAWINGS

Figure 1:
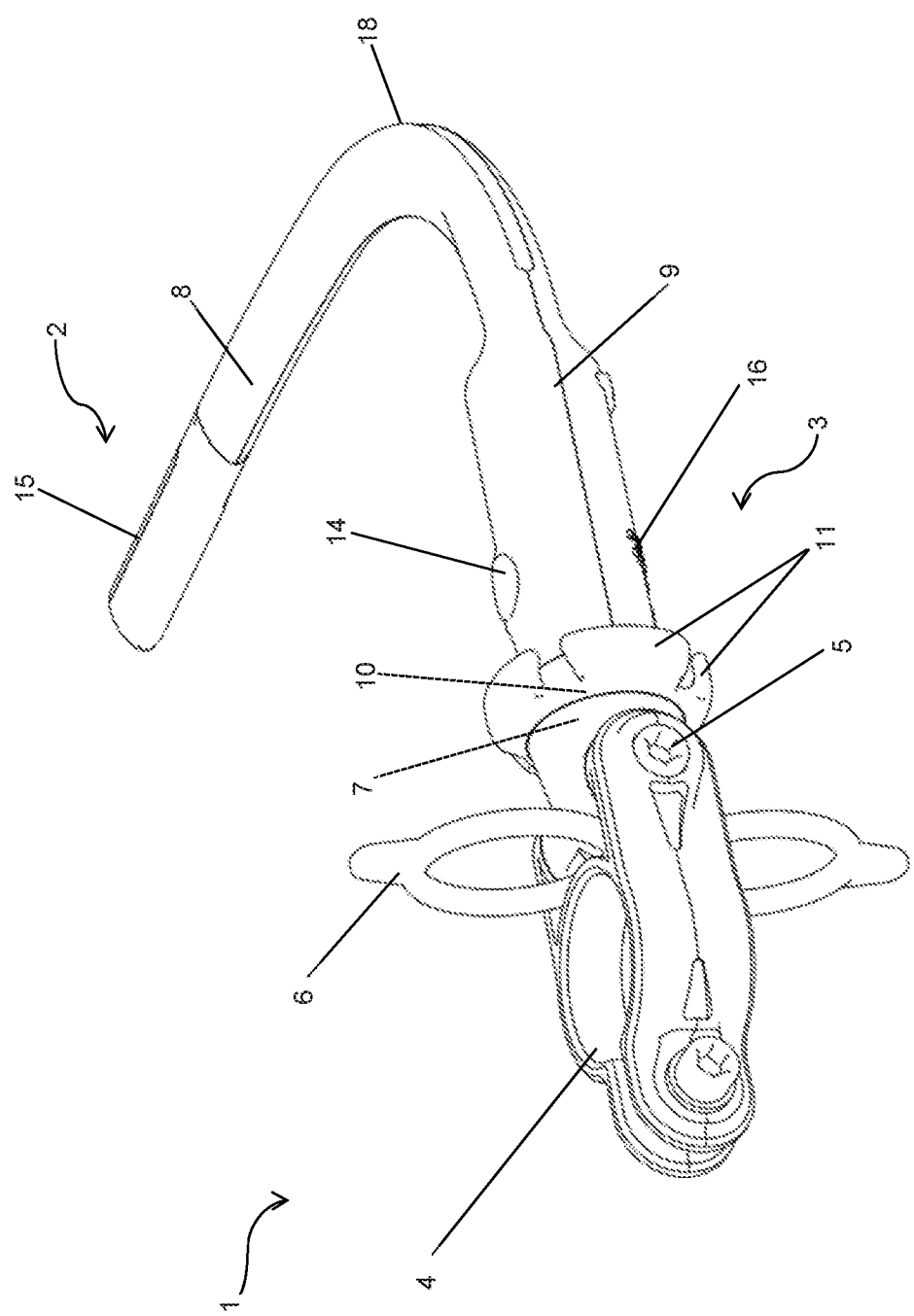
FIG. 1 is a perspective view of a two part mounting bracket of the invention with the two parts magnetically but not elastically coupled.
Figure 2:
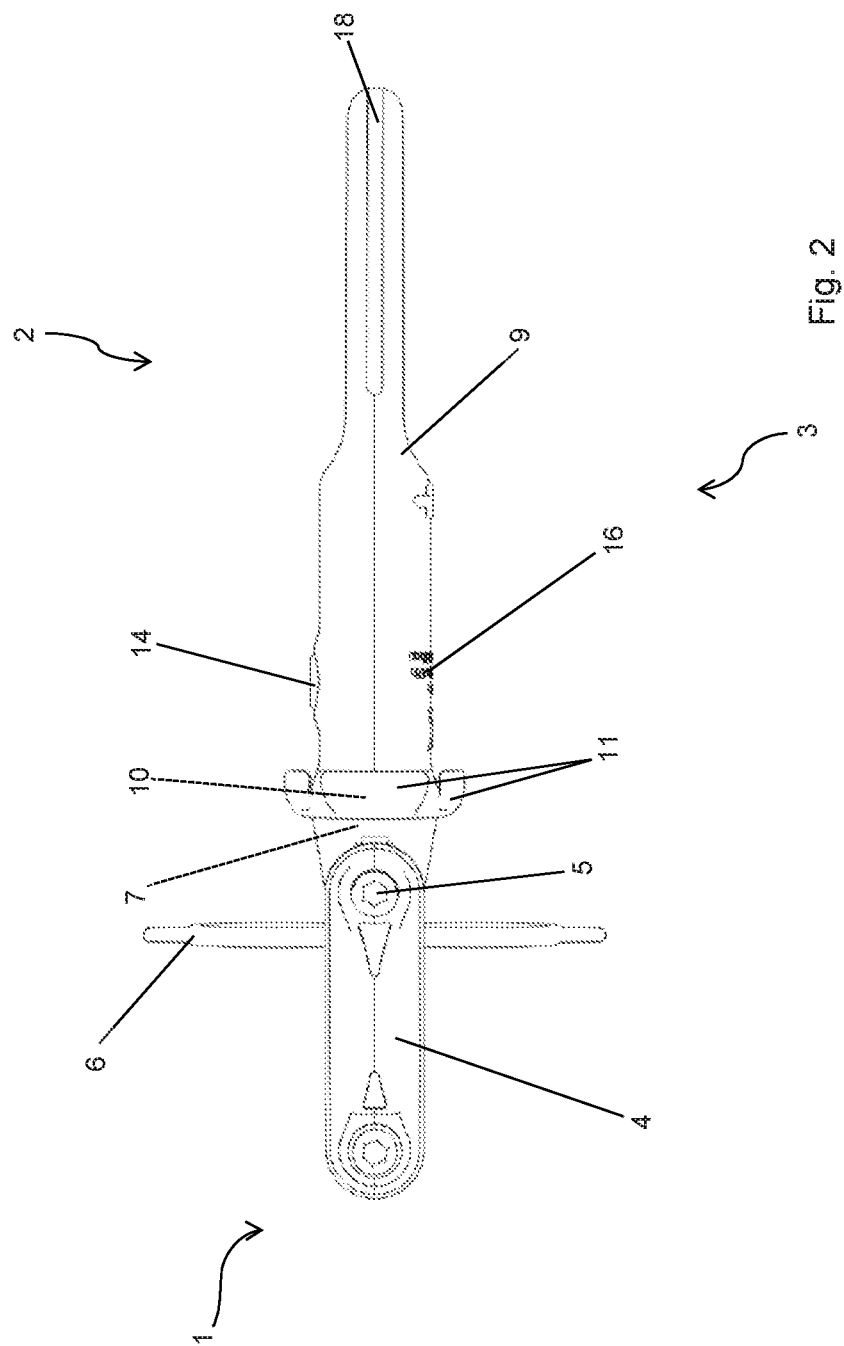
FIG. 2 is a side elevation of the two part mounting bracket of Figure.

Referring generally to FIGS. 1 to 6, a two part mounting bracket 3 (also referred to generally as the device 3) is shown. The mounting bracket 3 is formed of a first part 1 and a second part 2, which are entirely detachable from one another—see FIG. 5. The first part 1 is arranged to be mounted on a bicycle (not shown) by way of a mounting clamp 4. The mounting clamp 4 has a central aperture for receiving a tubular section of bicycle frame, usually the saddle post (the tube that carries the saddle and that is telescopically received in the bicycle frame to allow the height of the saddle to be adjusted), handlebars (parts held by a user's hands to turn the bicycle) or head tube (the vertical portion which holds the handlebars and allows them to rotate relative to the frame). The aperture in the mounting clamp 4 is sized to receive one of these tubes by bending two halves of the clamp 4 apart, fitting around the tube, and allowing the clamp 4 to spring back into position. The clamp 4 has a nut and bolt arrangement to tighten the clamp 4 around the tube and hold it firmly on the frame. The clamp 4 may be provided with one or more rubber shims (optionally of differing thicknesses) to assist in forming a tight grip around a variety of different tube diameters. The mounting bracket 3 can be moved in the yaw direction relative to the bicycle frame by adjusting the clamp 4 and swinging the whole mounting bracket 3 around the bicycle frame.

The first part 1 also has a pitch-adjustable coupling 5, formed from a nut and bolt running laterally through the first part 1. The nut and bolt, when tightened prevent rotational movement of the pitch-adjustable coupling 5, for example by causing internal castellations (not shown) to interlock. By loosening the nut and bolt, the pitch-adjustable coupling is released to allow relative motion (e.g. by decoupling the castellations from one another). In this case the relative motion is in the form of flexing of the device to raise or lower the second part 2 by pivoting about the pitch-adjustable coupling 5. This can help to ensure that the light 15

(described in more detail below) can be arranged to face directly rearwards (or forwards), and also to adjust the height of the light 15.

Spaced apart from the mounting clamp 4 and the pitch-adjustable coupling 5 is a first magnet 7 embedded within the first part 1. In other words, the first magnet 7 is embedded in a distal end of the first part 1. As the first magnet 7 is embedded, it is not visible in some Figures and its approximate location is indicated in those Figures using a dashed line. The first magnet 7 is coupled to a second magnet 10 (also not visible in some views and therefore indicated with a dashed line), the second magnet 10 being embedded in the second part 2. As the second part 2 extends away from the coupling between the magnets 7,10, it can be seen that the second magnet 10 is embedded in the proximal end of the second part 2.

This arrangement allows the first 1 and second 2 parts to be coupled together by their respective magnets 7,10 (see FIG. 1) but can easily be decoupled from one another, as shown in FIG. 5. The magnets 7,10 can be made of any suitable material, for example iron-based magnets, neodymium magnets, Al—Ni—Co magnets, samarium cobalt magnets, etc. As many of these are brittle and/or suffer from corrosion due to water, air, etc., embedding the magnets 7,10 in the first 1 and second 2 parts can help to protect the magnets from both corrosion and from damaging knocks by shielding the magnets 7,10 from the outside environment. The magnets 7,10 are embedded such that one has a north pole directed towards the outside of the first part, and the other has a south pole directed to the outside of the second part. The outer surface of the first 1 and second 2 parts which are closest to the attractively cooperating poles of the magnets 7,10 form a coupling region, in the sense that these parts are intended to be in contact with one another. This ensures that when the two parts 1,2 are brought together, the magnets attract one another. It does not matter which part has the north pole facing outward, and which has the south pole facing outward.

Even for strong magnets, it can be relatively easy to decouple the two parts 1,2 from each other. In particular, magnetic couplings provide little resistance to bending motions which lever the parts apart, and from twisting motions. Additional elastic coupling is therefore provided by way of two loops of stretchable material 6 attached to the first part 1, and four corresponding projections 11 on the second part.

Consider FIG. 1, in which the magnets 7,10 are coupling the first 1 and second 2 parts together. In order to selectively elastically couple the first 1 and second 2 parts together the loops 6 are stretched over the projections 11. Once in place (as shown in FIG. 6), pulling the two parts 1,2 apart is resisted as this requires stretching the loops 6. Additionally, twisting or bending motions force the loops 6 to stretch when they are hooked onto the projections 11, and thus such motions are also resisted by these cooperating engagement portions 6,11.

Figure 3:
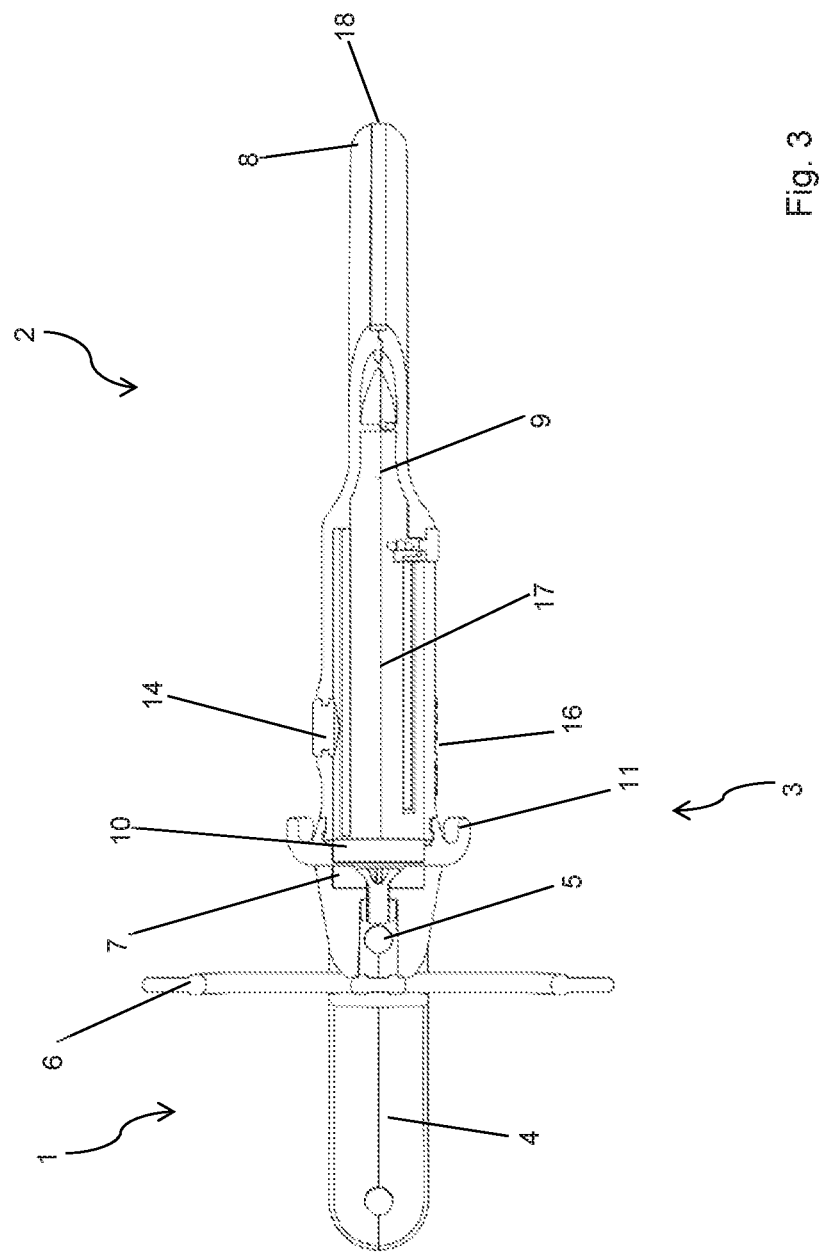
FIG. 3 is a sectional view through the two part mounting bracket of FIG. 2, shown from the same side elevation as FIG. 2.
Figure 4:
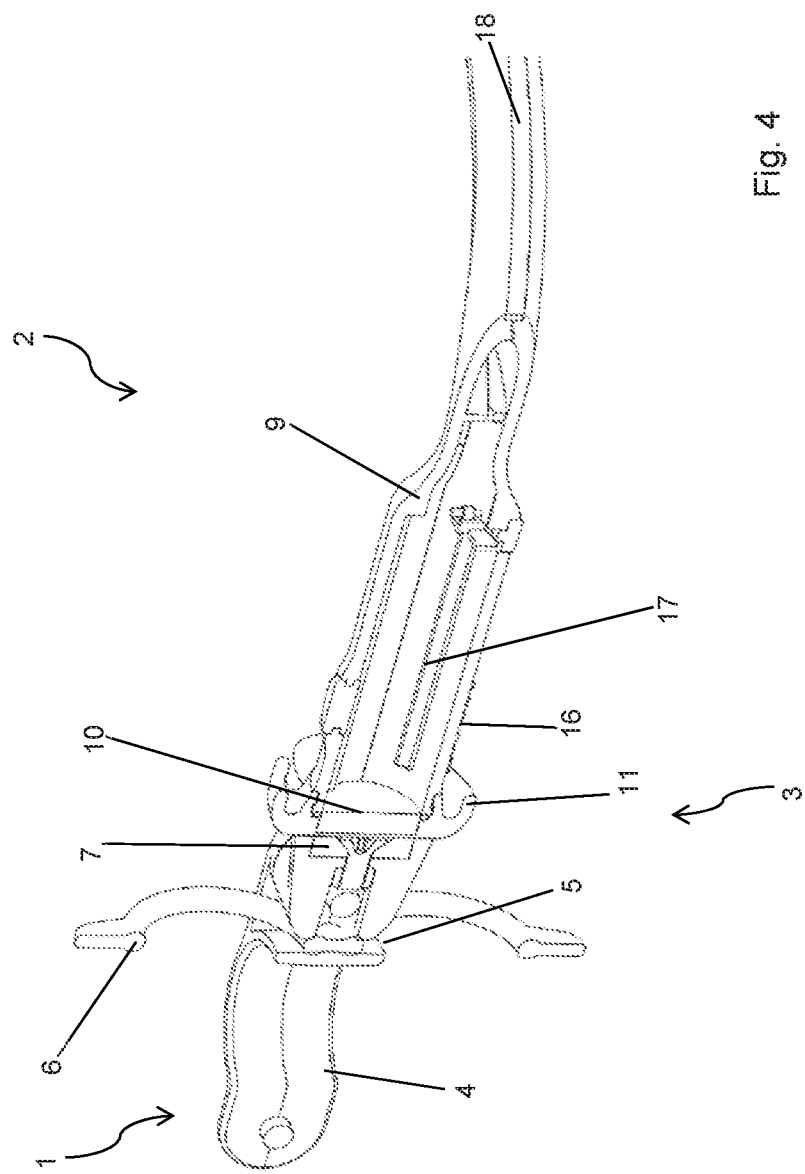
FIG. 4 is a perspective view of the section shown in FIG. 2.

The projections can be seen in FIG. 3 to have a U-shaped profile to provide a secure place to hold the stretchable loops 6. In addition, the projections 11 are shaped so as to be wider than the loops 6 as the loops 6 stretch over the projections 11. Due to this, additional lateral tension is formed in the loops 6, which also helps to hold the loops 6 securely on the projections 11.

It can be seen that a 90° rotation in the roll direction (with the magnets remaining coupled, but rotating around the attractive force vector between the magnets) of the second part 2 relative to the first part 1 allows the two loops 6 to stretch and hook over a different one of the four projections 11. That is, the coupling system (magnets 7,10, loops 6, and projections 11) has a four-fold symmetry about the roll axis.

The second part 2 can be seen to have a generally L-shaped form. A first portion of the second part extends laterally away from the plane of the bicycle, and is joined to the second portion 9 of the second part 2 by a junction of approximately 90°. The second portion 9 therefore serves to space the first portion 8 away from the magnetic coupling between the first 1 and second 2 parts, while the first portion 8 provides the lateral spacing of the light from the plane of the frame of the bicycle. The first portion 8 of the second part 2 has a light 15 at a distal end (i.e. furthest from the junction between the first 8 and second 9 portions). For rear mountings, this light 15 can be red, as it faces backwards relative to the bicycle frame. For front mountings, this light 15 will face forwards, and can be white. In some cases, the mounting may be provided with two lights, a forward facing white one and a rearward facing red one. Optionally, yellow or orange indicator lights (not shown) may be provided at the outermost (most distal) portions of the first portion 8. In other cases, the rear and/or front lights may comprise a row of smaller sub-lights, e.g. LEDs. Advantageously, these lights may be arranged to operate in a first mode in which all the sub-lights operate at once (in a continuous or flashing mode), and a second mode in which the sub-lights indicate a turning motion, for example by lighting sub-lights sequentially, to give the illusion of a motion to the left or right. Any or all of these lights or sub-lights (as the case may be) may be arranged independently to flash or provide continuous light. A reflective strip 18 is provided adjacent to the light to provide additional visibility.

As best seen in FIG. 5, which shows the first 1 and second 2 parts separated from one another, the coupling bracket 3 also has alignment portions 12,13. Specifically, the first part 1 is provided with a series of four equally spaced protrusions 12, which are rounded in profile and are arranged around a circular portion of the first part 1 (the circle being centred on the attractive force vector between the two magnets 7,10). The second part is provided with a corresponding set of four recesses 13, equally spaced around a circle centred on the attractive force vector between the two magnets 7,10. These protrusions 12 and recesses 13 are arranged to match each other in the sense that the shape of the protrusions 12 matches the shape of the recesses 13.

The protrusions 12 (and hence also the recesses 13) have a rounded profile to encourage slight angular mismatches to rotate slightly when presses together to align the first 1 and second parts 2 during a coupling process. This also contributes to the stabilizing effect, as twisting the protrusions 12 in their recesses 13 away from the fully engaged orientation requires that the second part 2 moves away from the first part 1, which requires the stretchable loops 6 to stretch further. Consequently, collectively the loops 6, projections 11, protrusions 12 and recesses 13 provide stability and resilience against unwanted roll motions.

Once more these protrusions 12 and recesses 13 have a four-fold rotational symmetry and thus the coupling is fully stable in any of four orientations, spaced from each other by 90° rotations about the roll axis, as provided by each of the protrusions 12 and recesses 13, as well as the loops 6 and projections 11.

The second part 2 is formed as a self-contained unit, in the sense that the electronic components can all be contained in the second part 2, which can be easily decoupled from the first part 1 (and hence from the bicycle frame). This allows a user to remove sensitive and valuable parts of the device 3 to prevent damage or theft. The second part 2 has a cavity 17 (see FIGS. 3 and 4) providing space for a battery, control electronics, wiring, etc. The cavity 17 can run the length of the second part 2 from the second magnet 10 to the light 15. The cavity 17 can be sealed from the outside world in a waterproof manner, to help protect these components from water damage. A button 14 is provided to allow a user to switch on and off the light 15. In some cases, the button 14 may have different functionality depending on whether it is pressed once, repeatedly, held for a period, etc. Alternatively where multiple functions are required, a more complicated interface, having for example a plurality of buttons, sliders, etc. may be provided.

A battery charging socket 16 is also provided to allow a user to easily charge the battery. This is particularly important where the second part 2 has a waterproof casing, because a user repeatedly opening the casing to replace batteries can cause damage to the waterproofing.

Consider now FIGS. 7A and 7B, which show a variant of the device 3 described above, specifically one in which the second part 2 is arranged to fold near the junction between the first 8 and second 9 portions. This can convert the L-shaped piece from a relatively cumbersome part to a more convenient oblong shape.

In a little more detail, the second part 2 is provided with a rotational coupling 19, on the first portion, close to the junction between the first 8 and second 9 portions. The rotational coupling 19 is arranged to rotate around a rotational axis A-A, as indicated by the arrow in FIG. 7A (although note that the second part 2 could fold in either rotational direction to transition between FIGS. 7A and 7B). After a 180° rotation (see FIG. 7B), the first portion 8 lies substantially parallel to the second portion 9, with the light 15 facing the second portion 9, and can help to protect the light 15 from damage.

This folded arrangement (FIG. 7B) can be easier for a user to carry around in a pocket than the unfolded arrangement shown in FIG. 7A, for example. The rotational coupling 19 is arranged to rotate about axis A-A slanted with respect to the lateral direction in which the first part extends by about 45°. Specifically, the slant is such that extending axis A-A would not intersect the second portion 9, but lies in the plane of the L-shape of the second part 2.

In order to ensure that the first part 8 is held rigidly extending in a lateral direction, the rotational coupling 19 may be provided with clips, clasps or clamps to hold the second part 2 in the unfolded (L-shaped) configuration. Additionally, the same or different clips, clasps or clamps may be provided to hold the second part 2 in the folded (oblong) configuration. In cases where the second part 2 houses a battery and a light 15, a feedthrough may be provided inside the rotational coupling to allow wires to connect the battery to the light 15, such that they are not damaged in the folding process. In such cases, it may be desirable to limit the range of motion if the rotational coupling to ensure that a 180° twist in a first direction to transition from FIG. 7A to FIG. 7B must be canceled by a 180° twist in a second direction opposite the first direction to transition the other way, from FIG. 7B to FIG. 7A. This can prevent repeated rotations causing twisting of the wires, which can eventually lead to failure.

Of course, variations of the design of the folding example may be provided. For example, depending on the exact shape of the second part 2, the angle which the rotational coupling (and indeed axis A-A) may not be exactly 180°. In other examples, the rotational coupling 19 may be located in a different location, for example on the second portion 9. In yet further cases, there may be no rotational coupling, but a hollow flexible tube may be used with suitable clasps, etc., to keep the first portion 8 extending rigidly in the unfolded configuration.

It should be noted that various features disclosed in connection with one example may be applied to other examples disclosed herein. Equally the embodiments described show many features, not all of which are essential to the invention, which is defined in the appended claims.

The invention claimed is:

1. A two part mounting bracket for a bicycle light, the mounting bracket comprising:
a first part for mounting on part of a bicycle frame, the first part having a first magnet;
a second part having an elongate portion arranged to extend laterally away from the plane of the bicycle frame, the elongate portion being arranged for holding a light source at a distal end, and having a having a second magnet arranged towards the proximal end, the second magnet configured to engage with the first magnet to couple the first and second parts together; and wherein
the first and second parts are provided with cooperating engagement portions for selectively elastically engaging the first and second parts with one another.

2. The two part mounting bracket of claim 1, further comprising first alignment portions on the first part and second alignment portions on the second part, arranged to cooperatively align the first and second parts.

3. The two part mounting bracket of claim 2, wherein the cooperating alignment portions comprise at least one protrusion on one of the first and second parts; and
a corresponding recess on the other of the first and second parts.

4. The two part mounting of claim 3, wherein the protrusion and the recess each have a curved profile.

5. The two part mounting bracket of claim 1, wherein the cooperating engagement portions comprise a loop of stretchable material on one of the first and second parts; and a projection for retaining the loop of stretchable material on the other of the first and second parts.

6. The two part mounting bracket of claim 5, wherein the projection is shaped to cause the loop of stretchable material to flare outward when the loop of stretchable material is stretched over the projection.

7. The two part mounting bracket of claim 1, wherein the second part is generally L-shaped, such that the elongate portion arranged to extend laterally away from the bicycle frame forms a first portion and a second portion extends transversely away from the first portion to space the first portion away from the coupling between the first and second parts.

8. The two part mounting bracket of claim 7, wherein the second part is foldable from the generally L-shaped configuration to a generally oblong configuration.

9. The two part mounting bracket of claim 1, further comprising an adjustable connection between the bicycle frame and the distal end of the second part for adjusting the pitch of the second part relative to the bicycle.

10. The two part mounting bracket of claim 1, further including a light mounted on the distal end of the second part.

11. The two part mounting bracket of claim 10, wherein the light is directed rearwardly or forwardly of the bicycle frame.

12. The two part mounting bracket of claim 1, wherein the second part comprises a water-resistant housing, having a cavity for receiving electronic components.

\* \* \* \* \*